R. G. McCLARY.
METHOD OF MAKING PISTON RINGS.
APPLICATION FILED AUG. 8, 1917.
1,277,231.  Patented Aug. 27, 1918.
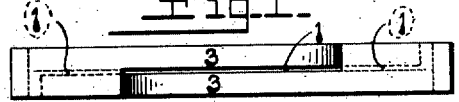
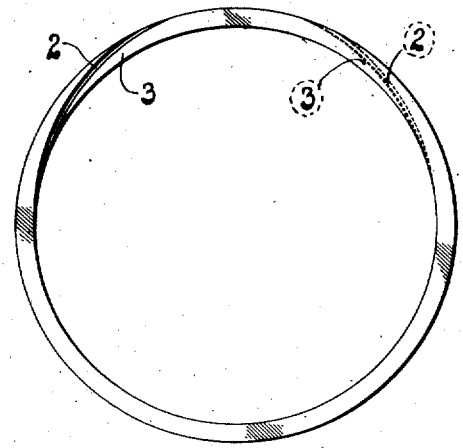
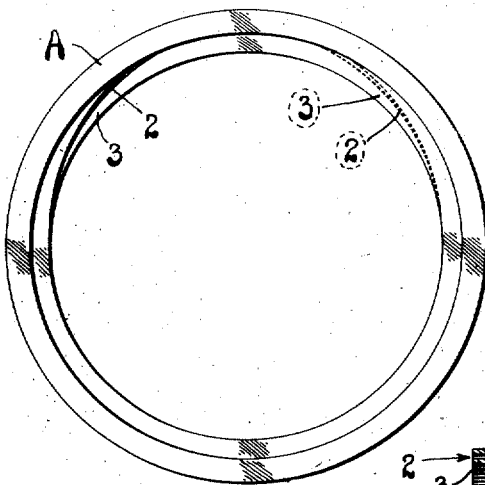
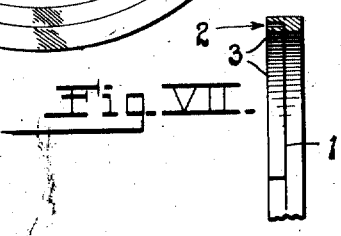
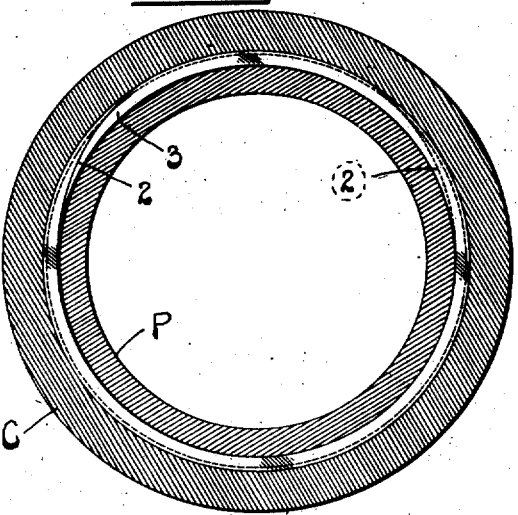
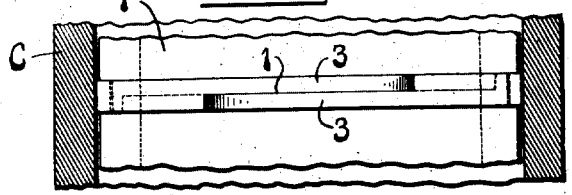
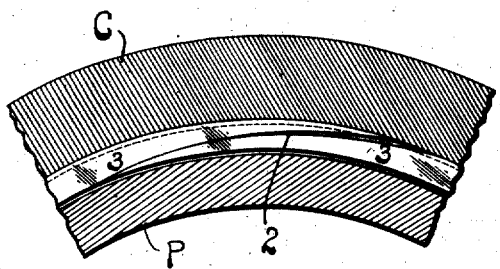
Attest.
Charles A. Becker.
W. Elwood Allen.
Inventor
R. G. McClary
By
His Attorneys.

UNITED STATES PATENT OFFICE.

ROBERT G. McCLARY, OF WELLSTON, MISSOURI.

METHOD OF MAKING PISTON-RINGS.

1,277,231.   Specification of Letters Patent.   Patented Aug. 27, 1918.

Application filed August 8, 1917. Serial No. 185,132.

*To all whom it may concern:*

Be it known that I, ROBERT G. MCCLARY, a citizen of the United States of America, a resident of Wellston, in St. Louis county, State of Missouri, have invented certain new and useful Improvements in Methods of Making Piston-Rings, of which the following is a full, clear, and exact description, reference being had to the accompanying drawing, forming a part of this specification.

My invention relates to improvements in methods of making piston rings, the main object being to produce a simple, inexpensive and highly efficient leak-proof piston ring.

Figure I is a plan view of the ring as it appears during a preliminary stage of the process of manufacture.

Fig. II is a side elevation of the ring shown in Fig. I.

Fig. III shows the ring contracted and arranged in an annular holder.

Fig. IV is a transverse section, partly in elevation, illustrating the finished ring applied to a piston and cylinder.

Fig. V is a plan view of the piston and the ring, the cylinder being shown in section.

Fig. VI is an enlarged exaggerated view showing portions of a piston and cylinder, and also showing the tapered slit at one of the sides of the ring.

Fig. VII is a transverse section of the finished ring, showing one of the yielding tongues and the recess in which the tongue is mounted.

In making the new device, a solid ring is slitted as shown in Figs I and II. A circumferential slit 1 is formed in the inner face of the ring. The end portions of this slit are formed only in the inner face of the ring while the intermediate portion of the slit is formed entirely through the ring. The last mentioned portion of the slit is preferably equal, in length, to about one-sixth of the outer circle of the ring. This circumferential slit may be readily formed by a circular cutting device moving in an arc of a circle.

An elongated arcuate slit 2 is formed across each side face of the ring at points opposite the respective end portions of the circumferential slit, so as to provide a free tongue 3 at each side of the ring. The arcuate slits 2 can also be very easily formed by a cutting device moving in an arc of a circle. By slitting a solid ring in this manner, I produce a pair of free yielding tongues 3, at the same time producing tongue-receiving pockets at the sides of the ring. The slit 1 is formed at the circumferential center line of the ring, and each tongue 3 is uniform in width throughout its length. However, the free ends of the tongues are tapered so that they will yield more freely, for a purpose to be hereinafter described.

When the ring is slitted as shown in Figs. I and II, the tongues 3 are separated from each other at the circumferential slit 1, and the tapered ends of the tongues are separated from the main body of the ring at the transverse slits 2.

The next step consists in contracting the ring and placing it in an annular holder A, as shown in Fig. III. During the operation of contracting the ring, the circumference of the ring is reduced, and this is accomplished without bending the free end portions of the tongues 3. When the ring is in the condition shown in Fig. II, the gap formed by each arcuate slit 2 is uniform in width throughout its length, but if the ring is contracted without changing the curvature of the outer faces of tongues 3, the slits 2 will not be uniform in width. My object is to taper the slits 2, making them relatively wide at the outer circle of the ring, and this is accomplished by first contracting the ring without bending the free end portions of the tongues 3, and then heating the contracted ring while it is confined in the annular holder A. Thereafter, the ring tends to remain in the condition shown in Fig. III.

When the ring is taken from the holder A, the circumferential slit 1 may be closed by springing one of the tongues 3 over the other tongue, *i. e.*, by reversing the relative positions of said tongues 3, and then replacing the free ends of the tongues in the recesses at the sides of the ring. The temporary reversal of the relative positions of the free tongues distorts or bends the metal ring, thereby straining the metal, and when the tongues are restored to their proper relative positions they will contact with each other at the circumferential slit 1. By springing the tongues in this manner they will afterward remain in engagement with each other at the slit 1. In so far as the present invention is concerned, the ring may or may not be heated while the tongues are reversed to strain or bend the metal. Although some advantage may be gained by heating the distorted ring, the desired result could be obtained by merely bending the metal so as to produce permanent molecular changes therein.

The faces of the ring may be finished in any suitable manner, and the ring is then ready for service, the tongues 3 being yieldingly engaged with each other at the slit 1, and the slits 3 being tapered as shown in Figs. III and VI. When the ring is applied to a piston P and cylinder C (Figs. IV and V) it is preferably contracted so as to entirely close the slits 2. After the ring is in service for some time it will expand on account of wear, and the slits 2 will then open slightly as shown in Fig. VI. Since these slits 2 are tapered when the ring is in its free or expanded condition, said slits 2 can open slightly as shown in Fig. VI, without permitting leakage across the ring. The free ends of the tapered tongues 3, tending to spring outwardly, will remain in contact with the body portion of the ring after the slits 2 have opened slightly at the outer circle of the ring. It is to be understood that these free ends were sprung inwardly toward the center of the ring when the latter was contracted and fitted to the cylinder. Therefore, the free ends of the tongues will remain in engagement with the body of the ring (Fig. VI) to prevent leakage through the slits 3.

I claim:—

1. The method of making piston rings which comprises forming a circumferential slit in the inner face of a ring, the ends of the circumferential slit being formed only in the inner face of the ring and the intermediate portion of said slit being formed entirely through the ring, forming elongated diagonal slits across the side faces of the ring at points opposite the respective end portions of the circumferential slit so as to provide a free tapered tongue, and a correspondingly shaped tongue-receiving recess at each side of the ring, and contracting the ring so as to yieldingly force the free end portion of each tapered tongue into engagement with the adjacent inner wall of the recess.

2. The method of making piston rings which comprises forming a circumferential slit in the inner face of a ring, the end portions of the circumferential slit being formed only in the inner face of the ring and the intermediate portion of said circumferential slit being formed entirely through the ring, forming elongated arcuate slits across the side faces of the ring at points opposite the respective end portions of the circumferential slit so as to provide a free tapered tongue and a correspondingly shaped recess at each side of the ring, and contracting the ring so as to yieldingly force the inner end portion of each tapered tongue into engagement with the adjacent face of the ring.

3. The method of making piston rings which comprises forming a circumferential slit in the inner face of a ring, the end portions of said circumferential slit being formed only in the inner face of the ring and the intermediate portion of said slit being formed entirely through the ring, also forming arcuate transverse slits in the side faces of the ring at points opposite the respective end portions of the circumferential slit, thereby producing a pair of tongues separated from each other at the circumferential slit and separated from the main body of the ring at the arcuate transverse slits, and thereafter springing said tongues to close the circumferential slit.

4. The method of making piston rings which comprises forming a circumferential slit in the inner face of a ring, the end portions of said circumferential slit being formed only in the inner face of the ring and the intermediate portion of said slit being formed entirely through the ring, also forming arcuate transverse slits in the side faces of the ring at points opposite the respective end portions of the circumferential slit, thereby producing a pair of lapping tongues separated from each other at the circumferential slit and separated from the main body of the ring at the arcuate transverse slits, contracting the ring so as to move the arcuate face of each tongue toward the adjacent arcuate face on the main body of the ring, the gap between the adjacent arcuate faces being tapered when the ring is thus contracted, heating the ring while it is in said contracted condition, and springing one of the free tongues over the other so as to reverse the relative positions of the tongues, thereby bending the ring and thereafter replacing said tongues to close the circumferential slit.

In testimony that I claim the foregoing I hereunto affix my signature.

ROBERT G. McCLARY.